March 2, 1965 V. F. ZAHODIAKIN 3,171,461
FASTENING DEVICE
Filed Aug. 17, 1961
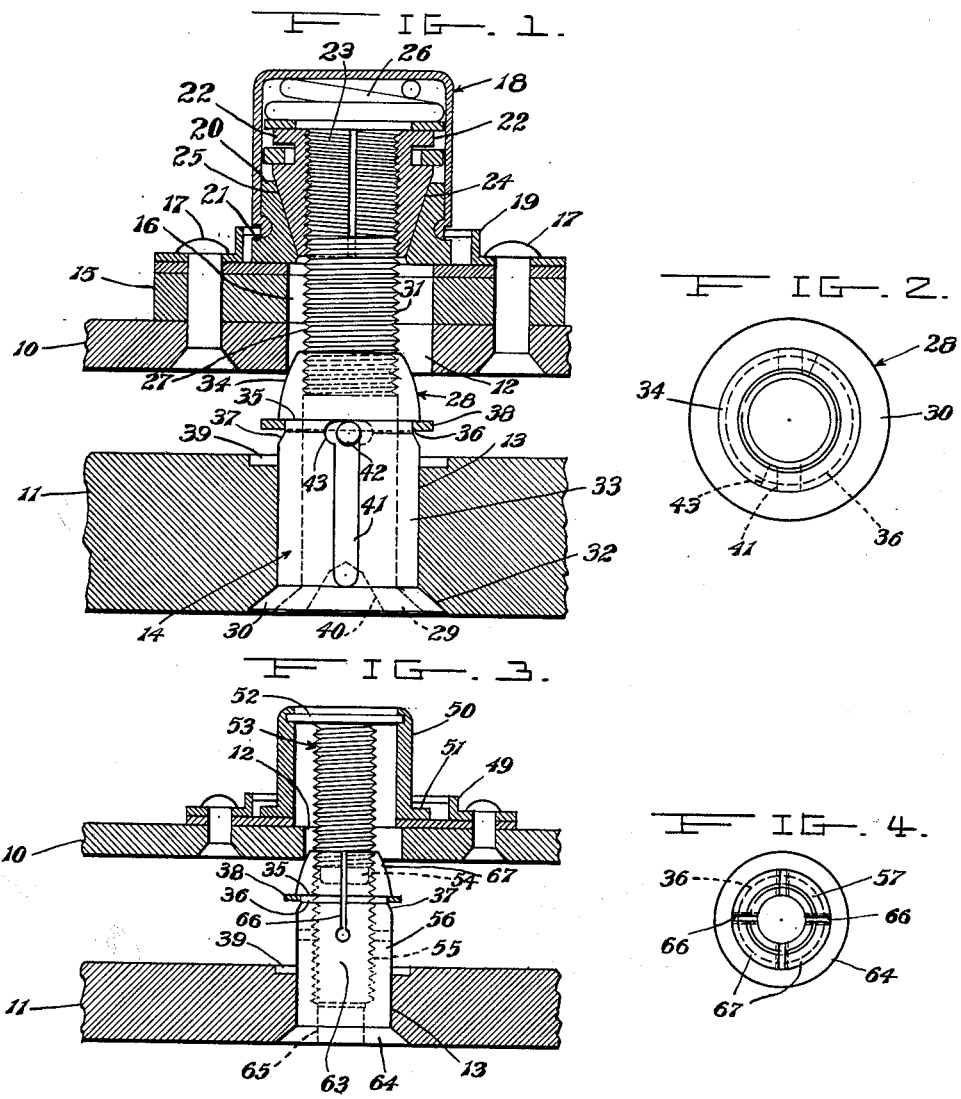
INVENTOR.
VICTOR F. ZAHODIAKIN
BY Howard P. King
ATTORNEY.

United States Patent Office 3,171,461
Patented Mar. 2, 1965

3,171,461
FASTENING DEVICE
Victor F. Zahodiakin, P.O. Box 689, Summit, N.J.
Filed Aug. 17, 1961, Ser. No. 132,215
5 Claims. (Cl. 151—69)

This application is a continuation in part of my prior application Serial No. 805,602 filed April 10, 1959, and now abandoned.

This invention relates to fastening devices such as adapted for use in fastening together superposed panels or other members or assemblies.

Quickly operable devices of this general character have extensive uses in industry, as for use with aircraft as well as a variety of other applications for securing in place various members, such as plates, brackets, doors and panels, among numerous other parts and things. The invention has particular reference to fastening devices of the so-called push-rotary type, that is, of a type adapted to be secured in place by pressing on the head of the stud to slide it inwardly, and/or by rotation of the stud in its socket or receptacle. Fastening devices of this character comprise essentially a stud and a receptacle. My prior application, S.N. 821,026 filed June 17, 1959, now Patent No. 3,151,653 is directed more particularly to the receptacle construction, and as I can conveniently use that receptacle construction in connection with the present invention, reference may be had to said prior application for full details respecting the said receptacle. The present invention is directed more particularly to the post construction, shown de novo herein, and which is comprised essentially as a combined stud and sleeve or grommet.

In connection with airplane construction, overlapped plates are held together by many fastening devices, and from one cause or another, for instance, from twisting of the plates, or slight inaccuracies in punching the holes in the plates, difficulty is experienced in applying the fastening device, and also when the plane is to be serviced the lateral stress imposed by the plates against the fastening devices makes the removal of said devices to effect disengagement of the stud from its socket or removal of the grommet from the panels exceedingly difficult and often seemingly verging upon the impossible.

In its broad aspect, the present invention proposes a construction of fastening device that will function and operate more readily under difficult situations than fastening devices of the prior art.

Viewed also in its broad aspect, the invention is directed to utilization of a post constituted as a combination of a threaded stud and slidable sleeve or grommet thereon having limited rotation at the position of complete insertion of the stud in the sleeve or grommet and confined to longitudinal movement on the stud at other relative locations of the grommet on the stud.

Likewise of general nature, the invention contemplates a construction wherein the power developed by screw-thread engagement of the stud and receptacle may be utilized both for bringing the holes of the members being clamped into substantial registration and for unclamping purposes may be utilized to enforce removal of the stud and grommet notwithstanding heavy shear loads when release of the members is desired.

More specifically, an object of the invention is to provide lateral wedging areas for the post and to enforce longitudinal movement of such areas both during clamping assembly and during unclamping disassembly.

In greater detail, the invention provides a two-part post construction wherein one of said parts is a stud with means permitting relative longitudinal movement between said parts and preventing such movement under certain conditions.

Another object of the invention is to provide a post construction by which misaligned holes of members being clamped may be brought into axial alignment even where the misalignment is as great as the difference in radii of the stud and grommet.

Other objects, advantages and novel features of construction will become apparent to persons skilled in the art to which the invention appertains as the description proceeds, both by direct recitation thereof and by implication from the context.

Referring to the accompanying drawing, in which like numerals of reference indicate similar parts throughout the several views:

FIGURE 1 is a sectional elevation of one embodiment of the invention, showing the same in its relation to two members to be clamped the holes whereof are misaligned;

FIGURE 2 is an inner end view of the sleeve or grommet disclosed in FIG. 1;

FIGURE 3 is a sectional elevation of another embodiment of the invention; and

FIGURE 4 is an end view of the sleeve or grommet employed in the disclosure of FIG. 3.

At the outset of this description, observation is made that the fastener of the present invention is made in various sizes, both as to length and girth, to accommodate differing requirements presented by members to be clamped that differ in thickness and as to hole punchings. Accordingly in both FIGURES 1 and 3 the members to be clamped, though thicker in FIG. 1 than in FIG. 3, are designated by reference numerals 10 and 11 and represent any number and thickness of bodies to be clamped together. For distinguishing purposes, member 10 will be arbitrarily designated as the inner member, and the other will likewise arbitrarily be designated the outer member 11. Said members have holes 12 and 13 therein intended in practice to register axially, but which frequently are slightly misaligned, and it then becomes a function of the present device to obtain the desired alignment of said holes, accomplished by telescoping a post 14 into said holes as said members are drawn together.

In order to provide desired additional thickness, member 10 is shown with a spacer or reenforcing plate 15 localized to the vicinity of hole 12 and provided with a hole 16 of equal size and registering therewith. Rivets 17 are shown permanently securing the spacer plate 15 to the member 10. A receptacle or socket 18 is mounted on said reenforcing or spacer plate 15, and it is preferable that the same be what is known as a floating receptacle, which is to say, that it has a restricted freedom of movement to enable the axis to shift with respect to the axis of hole 16 in plate 15, but is restrained from dislodgement away from the mounting plate. Since floating receptacles are known in the art, more extended description is deemed unnecessary other than to say the showing in FIG. 1 includes a fixed collar 19 loosely receiving the lower end of receptacle housing 20 therethrough, the bottom of the housing having a flange 21 that projects laterally at two diametrically opposite areas under said collar. A corresponding floating mounting is provided for the socket of FIG. 3.

The receptacle disclosed in FIG. 1 may conveniently be made in accordance with the showing in my prior application S.N. 821,026 filed June 17, 1959 to which reference may be had for a full detailed description. Suffice it to say for purposes of the present invention, that the receptacle provides a pair of jaws 22 opposed to each other on opposite sides of the receptacle axis, that axis being in parallelism to the axis of the holes in the reenforcing plate and member to which attached. The facing sides of the jaws are hollow and provided with crescent-shaped threads 23. The outer faces of the jaws remote from said axis, are inclined and formed as cylindrical segmental inclined faces 24 which ride on corresponding segmental cylindrical inclined lands 25 of the receptacle. A spring 26 tends to move said jaws down the incline and toward each other.

In the specific embodiment of the invention illustrated in FIG. 1, the post 14 is shown essentially as a two-part construction having a stud 27 longer than and projecting longitudinally through a sleeve or grommet 28. Both the stud and sleeve have flaring heads and the flare of head 29 of the stud nests within the flared head 30 of the sleeve when the stud is pushed home in the sleeve. That part of the stud shank which protrudes from the sleeve in the pushed-home relation, is screw threaded to mesh with the jaw threads at 31 and from said threads to the head 29 said stud is cylindrical and has a movable fit within the hollow of the sleeve 28 permitting a restricted rotary and longitudinal movement of the stud with respect to the sleeve as hereinafter explained more in detail.

The outer peripheral surface of the sleeve, for a distance sufficient for it to protrude through member 11 into member 10, has a diameter equal to the diameter of holes 12 and 13 so the sleeve will slide through the outer member hole and project into the inner member hole when the flared head of the sleeve seats in a countersunk flared seat 32 at the outer face of the outer member. For identification purposes, the cylindrical portion 33 of the sleeve will hereinafter be referred to as the bearing portion 33. In use, the sleeve is pushed or drawn into the hole 13 of the outer member until its flared head 30 seats in outer member 11 at which time the inner end of said bearing portion 33 protrudes into hole 12 of inner member 10. Under those conditions, since holes 12 and 13 are of a size equal to each other and equal to the diameter of said bearing portion 33 (which is of constant diameter throughout its length) the holes will of necessity then be coaxial and shear stresses between the members will be exerted against said bearing portion 33 of the sleeve.

The forward end of the sleeve, that is, the end thereof remote from the flared head, has an exterior bullet-shape configuration which flares rearwardly from substantially the diameter of the stud to the diameter of the bearing portion 33 thereby providing a nose adapted to be inserted into a misaligned hole 12 and by forceful wedging thereinto functioning to shift the member 10 and brings said hole into registration. The bullet-shape of the extremity of the sleeve enables the user to probe with it for the misaligned hole and avoids injury to the stud threads in performance of that operation.

Between the forward end of the bearing portion 33 and the largest part of the bullet-shaped nose 34, the sleeve is formed with a rearwardly facing ledge 35 in a plane perpendicular to the axis, said ledge being constituted as the most forward wall of a peripheral groove 36 the other wall 37 of which tapers from the bottom of the groove to the forward end of aforementioned bearing portion 33 of the sleeve. Said tapered wall 37 has an angle of its surface to the axis of approximately 30°. A resiliently contracting snap ring 38 is applied to the sleeve 28 and is adapted to seat in said groove 36 and is prevented from sliding onto the nose 34 by virtue of engagement with said ledge 35, but it can be wedgingly dilated by riding up the inclined wall 37 of the groove and thereby caused, on occasion, to girdle the end of bearing portion 33 where the latter projects through member 11. Said member preferably has an enlargement 39 of hole 13 at the face of said member directed toward the other member 10 of adequate dimensions to receive said snap ring therein and permit said members to be juxtaposed flatwise together. When the sleeve is moved rearwardly in direction tending to extract the same from the members, the snap ring will be caused to slide in a direction forwardly of the sleeve off of the bearing portion onto said tapered wall 37 which allows it to contract into said groove and into engagement with said ledge 35 thereby keeping the sleeve 28 assembled with the outer member 11 so the post will be ready for re-insertion. As the bullet-shaped end of the sleeve is forced into the hole 12 of inner member 10 the forward face of the snap ring 38 will come into engagement with that member whereupon the ring is caused to dilate as it rides onto the frusto-conical inclined wall 37 of the groove and ultimately again girdles the forward end of bearing portion 33 where that portion protrudes through outer member 11. It may be here called to attention, that in the extracted position of the sleeve limited by engagement of the ledge with the snap ring and engagement of the snap ring with the outer member, that only the bullet-shaped terminal of the sleeve protrudes from that member, so the two members will be almost juxtaposed before the said terminal begins to enter the hole 12 of the inner member. This circumstance will avoid to a great extent any misalignment that might be caused by tilting the members with respect to each other which might occur if the stud were of a long-protruding character. In innermost position of said stud 27 in the sleeve 28 and innermost position of the sleeve in the outer member 11, the outer end of the stud head 29 will be flush with the outer end of the sleeve head 30, and that in turn will be flush with the outer surface of said member. The outer head end of the stud may be provided with a kerf 40 for engagement by a screwdriver or other appropriate tool for both pushing the stud inwardly and for rotating it.

The forward or inner end of said stud 27 for such length thereof as may be caused to protrude from the sleeve is screw-threaded at 31 with threads of appropriate dimensions to engage the aforementioned threads 23 of the jaws, and by virtue of the crescent shape of the jaw threads, the stud may be pushed between the jaws with the jaw threads ratcheting on the stud threads until the stud is substantially home, after which the stud can be rotated to completely draw the members together. If there is a disalignment of holes 12 and 13 of the two members, power developed by the threaded rotation of the stud will result in the bullet-shaped terminal of the sleeve shifting the members to obtain axial alignment of the holes and bearing portion 33 which consequently is then partly in the two holes of both members.

It is now appropriate to point out that the sleeve 28 has longitudinal slots 41 on opposite sides thereof spaced 180° apart. The stud has a cross-pin 42 fixed therein with the ends of the pin riding in said slots. The parts are proportioned so that when the cross-pin is at the forward end of the slots, the stud head 29 will be nested in the flared pocket of the sleeve head. Also, when said cross-pin is at the outward end of the slot, the stud screw-threads will be entirely retracted into and protected by sleeve 28. At the inner or forward end of each slot there is provided a lateral slot off-set 43 extending toward the left. As the pin 42 will be located at this forward end of the slot when the stud screw threads are screwed home in the receptacle, the first partial rotation of the stud to release the same from the receptacle, will cause the pin 42 to move laterally into the off-set 43. Consequently, as the stud continues to be unscrewed, the pin causes the sleeve to correspondingly move both rotatively and longitudinally. Thus advantage is taken of power that can be developed by unscrewing the stud to force the sleeve out of the holes in the members notwithstanding shear stress that tends to bind the sleeve in these holes.

Except for lost motion afforded by the off-set 43, the stud and sleeve rotate at the same rate. From a consideration of the foregoing description in conjunction with the drawing, it will be appreciated that the invention includes several beneficial features of which special mention may be made of the provision of the smooth rounded or bullet-shaped terminal or nose for the sleeve enabling the same to probe for the hole in the member to be clamped. That bullet-shaped probing nose or terminal is relatively short in length and extends immediately from the ledge 35 against which the snap ring engages for limiting withdrawal of the sleeve. The bullet-shaped surface is not only smooth, but presents a progressive curve which will enable it to generate maximum lateral force for overcoming misalignment of the holes and for centering the hole into which inserted with minimum damage to the hole margin. Furthermore, it will be noted that the cylindrical bearing portion 33 is of constant diameter from its head to its groove and as here shown projects into member 10 a very short distance in the fully clamped position of the members, the distance approximating only a couple turns of the stud threads, so that only a short movement of the sleeve is required to relieve the sleeve from the shear stress when release of the clamping of the members is to be effected. Yet the stud threads and the jaw threads have long length of interengagement thereby providing great strength of the clamping function of the device in use. The stud is furthermore protected within the sleeve while the probing of the sleeve into the hole of member 10 is being performed, and then the stud can be pushed through that hole and is long enough to engage the jaw threads even with slight introduction of the stud into said jaw threads. At all positions of the stud threads in any or all of the jaw threads, there will be a prevailing torque applied to the stud threads by the jaw threads which will prevent inadvertent unscrewing of the stud. Furthermore, the provision of the off-set slot 43 obtains a longitudinal outward movement of the sleeve immediately upon starting to unscrew the stud, and that longitudinal movement promptly releases the bearing portion 33 from engagement in the hole 12 of the member 10. Since that longitudinal movement is obtained by the force applied by a screw driver multiplied by the operation of the threads, the release of the sleeve from member 10 is readily accomplished notwithstanding very strong shearing pressure laterally against the said sleeve. The inclination of the bullet-shaped terminal of the sleeve promptly relieves the shearing stress and further unscrewing of the stud is readily accomplished. The maximum diameter of the bullet-shaped terminal or nose is equal to the diameter of bearing surface 33 which is of constant diameter from the peripheral groove to the sleeve head. It also should be noted that in assembled clamping condition of the stud and sleeve, the snap-ring seats in the enlargement 39 and the bearing portion where the shearing stress is applied is beyond the snap ring but only slightly therebeyond in the present showing. Provision of the longitudinal slot 41 not only permits retraction of the stud to a position locating the threads of the stud entirely within said sleeve, but also enables the stud to be slid forwardly to engagement with the jaw threads and to slide across those jaw threads with a ratcheting action.

Giving attention now to the construction shown in FIGS. 3 and 4, I have again shown inner and outer members 10 and 11 which are to be clamped together, said members having holes 12 and 13 respectively of equal size. A floating receptacle is mounted on the inner member and comprises a fixed collar 49 loosely receiving the lower end of receptacle housing 50 therethrough, the bottom of the housing having a flange 51 that projects laterally at two diametrically opposite areas under said collar. The closure end 52 of said receptacle is fabricated separately and thereafter clinched immovably in place at the far end of the receptacle from said flange. Coaxial with said closure end 52 is a threaded stud 53 which extends coaxially to and through said housing. As one mode of manufacture, said closure end may be made integral with said stud and constitutes a head therefor. Said stud is preferably long enough to also protrude through hole 12 of member 10, and has an unthreaded reduced neck 54 for assisting in readily introducing the stud threads into internal threads 55 of a sleeve 56. The end terminal of said sleeve toward the stud has a smooth bullet-shaped exterior terminal 57 having all of the purposes and advantages hereinabove set forth with respect to the bullet-shaped terminal 34. It likewise constitutes a probing nose for starting insertion thereof into hole 12 of member 10 even in instances where there is not exact axial registration. Immediately beneath said nose there is a ledge 35, groove 36, and tapered wall 37 corresponding to those elements as above described. A snap ring 38 is adapted to seat in said groove against said ledge and adapted to be dilated when forcefully slid onto the tapered wall 37 and thence onto the cylindrical bearing surface 63 of said sleeve 56. The end of said stud remote from said bullet-shaped terminal end or nose, is provided with a flared head 64, and in said head there is an angular recess 65 of appropriate shape to receive a tool for rotating said sleeve. Longitudinally of said sleeve, starting at the nose end thereof and extending toward said head past said groove, are a plurality of slots 66 dividing the sleeve thereat into segments 67. The material of which the sleeve is made, is resilient and the segments are normally contracted toward the axis at their ends but are spread by insertion of the stud thereinto. The segments therefore apply prevailing torque to the stud threads at all positions of interengagement. The slits and resiliency of the segments also permit ratcheting of the stud threads sliding across the sleeve threads, and such ratcheting is augmented by utilizing crescent threads in the sleeve.

I claim:

1. A device of the character described for clamping members together, comprising a stud, a sleeve of shorter length than and located on said stud, said stud and sleeve having slot-and-pin connection, said slot having a longitudinal portion and an off-set portion limiting sliding and rotational movement of the stud with respect to the sleeve, said stud and sleeve having heads at corresponding ends thereof, and said stud having screw-threads at its end opposite from its said head for engagement in a threaded receptacle, said screw-threaded end of the stud projecting from the end of the sleeve when said heads of the stud and sleeve are juxtaposed, and said off-set portion of said slot projecting from the longitudinal portion thereof in a direction corresponding to direction of unscrewing the stud from the receptacle and being positioned at the inner end of said slot thereby enabling said pin to seat in said offset portion upon rotation of the stud in an unscrewing rotational direction, whereby unscrewing the stud with consequential longitudinal movement thereof imparts corresponding rotational and longitudinal movement to the sleeve enforcing dislodgement of said sleeve from the members.

2. A fastening device for members to be clamped together thereby, said members having holes required to be in axial alignment when said members are clamped together, a receptacle mounted on one of said members, a sleeve slidably mounted in the hole of the other said member, said sleeve having a nose of bullet shape tapering axially and radially inwardly at its forward end directed toward said receptacle, a stud fitting said sleeve and passing therethrough and engaging in said receptacle for pulling said nose into the hole of the member on which said receptacle is mounted, the tapering of said nose providing a surface extending longitudinally to a small forward end from a larger rear end integral with the sleeve, and said forward small end having a diameter at said surface of the nose substantially the same as the diameter of said stud, said stud and receptacle having screw threads adapted to be interengaged and said sleeve has a longitudinal slot, means engaging said stud and said slot at the slot end most proximate to the said sleeve nose deterring relative rotation between said sleeve and stud, and said slot and associated means having transverse interengagement in a circumferentially offset portion of said slot in a direction toward rotative unscrewing movement of the said stud and effective when the stud is fully advanced into said sleeve and thereat necessitating positive longitudinal withdrawal sliding of said sleeve from the receptacle as the stud is unscrewed from the receptacle with the stud and sleeve retracting therefrom simultaneously and with simultaneous rotary motion of stud and sleeve.

3. A fastening device for members to be clamped together thereby, said members having holes required to be in axial alignment when said members are clamped together, a receptacle mounted on one of said members, a sleeve slidably mounted in the hole of the other said member, said sleeve having a nose of bullet shape tapering axially and radially inwardly at its forward end directed toward said receptacle, a stud fitting said sleeve and passing therethrough and engaging in said receptacle for pulling said nose into the hole of the member on which said receptacle is mounted, the tapering of said nose providing a surface extending longitudinally to a small forward end from a larger rear end integral with the sleeve, and said forward small end having a diameter at said surface of the nose substantially the same as the diameter of said stud, said stud and receptacle having screw threads adapted to be interengaged and said stud is both slidable and rotatable in limited amount with respect to said sleeve, said sleeve having a longitudinal slot with the slot providing a lateral off-set at the slot end most proximate to the said sleeve nose and projecting in a direction toward relative unscrewing movement of the stud, said stud having a pin riding in said slot and in fully advanced location of said pin in said slot registering with said off-set and entering the same under actuation of unscrewing movement of the stud, thereby necessitating positive longitudinal withdrawal sliding of said sleeve from the receptacle as the stud is unscrewed from the receptacle with the stud and sleeve retracting therefrom simultaneously and with simultaneous rotary motion of stud and sleeve.

4. A fastening device in accordance with claim 3, wherein said slot is longitudinal of the sleeve for control of sliding of said sleeve on the stud, and said slot having a lateral off-set at its end more proximate to said nose in a direction admitting the pin therein when unscrewing the stud, said off-set thereby permitting the said limited amount of rotation and by non-registration with the longitudinal slot thereby effecting longitudinal withdrawal sliding of said sleeve from the receptacle as the stud is unscrewed from the receptacle with the stud still fully advanced in the sleeve and the stud and sleeve retracting from the receptacle simultaneously and with simultaneous rotary motion of stud and sleeve.

5. A fastening device of the character described, comprising a stud and a sleeve, said sleeve providing a cylindrical bearing surface and a nose tapering substantially to the diameter of the stud for enabling said bearing surface to be forced into misaligned holes of members to be clamped, said stud having screw-threads at an end thereof for engagement in a threaded receptacle to forcefully introduce said nose and bearing surface into the said misaligned hole by screwing said stud home in said receptacle, and said stud and sleeve having a lost motion interengaging means for rendering said screw-threads effective during the first turn of the stud unscrewing it from its home position to both rotate and positively eject the sleeve longitudinally and thereby start and continue removal of said bearing surface of the sleeve from said misaligned hole during initial unscrewing rotation and longitudinal movement of said stud from said receptacle, said stud and sleeve retracting from home position with simultaneous rotation and longitudinal movement.

References Cited by the Examiner
UNITED STATES PATENTS

| | | | |
|---|---|---|---|
| 1,479,583 | 1/24 | Carey. | |
| 1,971,200 | 8/34 | Proctor | 85—1 |
| 2,737,222 | 3/56 | Becker | 151—69 |
| 2,853,112 | 9/58 | Poupitch | 151—69 |
| 2,877,817 | 3/59 | Rockwell | 151—41.7 |
| 2,949,143 | 8/60 | Shur | 151—69 |
| 2,972,367 | 2/61 | Wootton | 151—41.7 |
| 2,991,816 | 7/61 | Harbison et al. | 151—69 |
| 3,037,542 | 6/62 | Boyd | 151—69 |

EDWARD C. ALLEN, *Primary Examiner.*

CARL W. TOMLIN, *Examiner.*